United States Patent
Zepeda

(10) Patent No.: US 11,313,290 B2
(45) Date of Patent: Apr. 26, 2022

(54) TURBO SYSTEM CONTROL

(71) Applicants: Hyundai Motor Company, Seoul (KR); Kia Motors Corporation, Seoul (KR)

(72) Inventor: Alexander Zepeda, Riverside, CA (US)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/930,767

(22) Filed: Jul. 16, 2020

(65) Prior Publication Data

US 2022/0018295 A1 Jan. 20, 2022

(51) Int. Cl.
*F02D 41/00* (2006.01)
*F02B 37/18* (2006.01)

(52) U.S. Cl.
CPC .......... *F02D 41/0007* (2013.01); *F02B 37/18* (2013.01); *F02D 2200/0404* (2013.01); *F02D 2200/0406* (2013.01); *F02D 2200/602* (2013.01)

(58) Field of Classification Search
CPC ................................ F02B 37/18; F02B 37/16
See application file for complete search history.

(56) References Cited

U.S. PATENT DOCUMENTS

| | | |
|---|---|---|
| 9,399,399 B2 | 7/2016 | Panciroli |
| 2011/0113755 A1 | 5/2011 | Kim |
| 2015/0159601 A1* | 6/2015 | Luehrsen ......... F02M 35/10222 123/564 |
| 2018/0245507 A1 | 8/2018 | Kitaura |
| 2018/0283268 A1 | 10/2018 | Xiao et al. |

FOREIGN PATENT DOCUMENTS

| | | |
|---|---|---|
| CN | 101994582 A | 3/2011 |
| WO | 2015/006823 A1 | 1/2015 |

* cited by examiner

*Primary Examiner* — Ngoc T Nguyen
(74) *Attorney, Agent, or Firm* — Mintz Levin Cohn Ferris Glovsky and Popeo, P.C.; Peter F. Corless

(57) ABSTRACT

A method of controlling a turbocharged engine system including customized and selective operation of a turbocharger bypass valve to modulate air pressure through an intake system of the engine to achieve certain desirable auditory feedback, which are deliberately generated through control of engine systems. Additionally, the method may include receiving a user input corresponding to one of a plurality of turbocharger modes. Further, the method may include, in response to receiving the user input, determining an intake air pressure of an intake manifold of the turbocharged engine system. Still further, the method may include comparing the intake air pressure of the intake manifold with a predetermined threshold. Even further, the method may include adjusting a position of a bypass valve based on the turbocharger mode corresponding to the user input and the intake air pressure in comparison to the predetermined threshold. Related apparatuses, systems, techniques and articles are also described.

16 Claims, 3 Drawing Sheets

TURBO SYSTEM CONTROL

FIELD OF THE DISCLOSURE

The present disclosure relates generally to a turbocharged engine method and system of controlling the same.

BACKGROUND

Generally, turbochargers are used to increase engine performance by using an exhaust driven turbine that drives a compressor, which forces pressurized air into the engine, ultimately increasing power output of the engine. In certain conditions, excess pressure in the system must be rerouted for performance and efficiency considerations. Developed solutions allow for electronic control of a bypass valve; however, the control is made dependent on, for example, optimal engine operation, fuel efficiency, measurable conditions of the engine, or driving conditions. Typically, the bypass valve is disposed in the exhaust system (not the intake system) and operated for optimal performance. However, such systems do not take into consideration effects of bypass valve control on noise, vibration, and harshness (NVH) characteristics of a vehicle, particularly in the context of turbocharged engines. Specifically, excess pressure in the turbocharged engine system is not controlled to achieve certain desirable sound effects.

Additionally, in the related art, a user might voluntarily select or be prompted to select a "sport mode" or an "economy mode", which results in changes to a torque map, a shift pattern, and/or a gauge cluster. However, changes in a vehicle auditory response have not been incorporated into engine control systems of the related art. Indeed, in the related art, with some control systems for turbocharged engines, NVH effects were intentionally suppressed. High performance (power or fuel economy) were regarded as more important than any particular NVH effect or characteristic.

SUMMARY

One or more of the following features may be included in any feasible combination.

The present disclosure provides a method of controlling a turbocharged engine system. The method may include receiving a user input corresponding to one of a plurality of turbocharger modes. Additionally, the method may include, in response to receiving the user input, determining an intake air pressure of an intake manifold of the turbocharged engine system. Further, the method may include comparing the intake air pressure of the intake manifold with a predetermined threshold. Still further, the method may include adjusting a position of a bypass valve based on the turbocharger mode corresponding to the user input and the intake air pressure in comparison to the predetermined threshold. The bypass valve may be disposed between the intake manifold and a turbocharger of the turbocharged engine system.

The plurality of turbocharger modes may include a whoosh mode, a flutter or choo-choo mode, a default mode, and a custom mode. The whoosh mode may include changing the position of the bypass valve to route excess air pressure from an intake circuit to an atmosphere via an exhaust line. The flutter or choo-choo mode may include changing the position of the bypass valve to restrict intake pressure from an intake circuit from venting to an atmosphere via an exhaust line. Additionally, the flutter or choo-choo mode may include changing the position of the bypass valve to reroute intake pressure from an intake circuit to an ambient air intake via a return line. The default mode may include changing the position of the bypass valve to mitigate excess air pressure on an intake circuit in response to a position of a throttle valve restricting air flow to an intake manifold by rerouting intake air from the intake circuit to an ambient air intake via a return line or by rerouting intake air from the intake circuit to an atmosphere via an exhaust line. Additionally, the custom mode may include the whoosh mode, the flutter or choo-choo mode, and the default mode.

The method may further include detecting a position of an accelerator pedal to determine whether the accelerator pedal is engaged or disengaged. Additionally, the method may further include detecting a position of a throttle valve to determine whether the throttle valve is open or closed. Further, the method may further include adjusting the position of the bypass valve based on the turbocharger mode corresponding to the user input, the intake air pressure exceeding the predetermined threshold, the accelerator pedal being disengaged, and the throttle valve being closed. The bypass valve may be disposed between the intake manifold and a turbocharger of the turbocharged engine system.

Additionally, the present disclosure provides a turbocharged engine system. The turbocharged engine system may include a turbine connected to an exhaust gas line. Further, the turbocharged engine system may include a compressor connected to the turbine. Both the turbine and the compressor may be connected to an ambient air intake via a return line. Still further, the turbocharged engine system may include an intercooler connected to the compressor via a first portion of a first intake circuit. Even further, the turbocharged engine system may include a controller. The controller may be configured to transmit operating instructions to an intake air pressure bypass valve. The intake air pressure bypass valve may be connected to the intercooler via a second portion of the first intake circuit. Additionally, the intake air pressure bypass valve may be connected to the turbine, the compressor, and the ambient air intake via the return line. Further, the intake air pressure bypass valve may be connected to an atmosphere via an exhaust line.

The turbocharged engine system may include an intake manifold connected to the intake air pressure bypass valve and a throttle valve via a second intake circuit. Additionally, the turbocharged engine system may include a customer selection interface configured to receive a user input corresponding to one of a plurality of turbocharger modes, and configured to transmit operating instructions to the controller based on the turbocharger mode corresponding to the user input.

The controller of the turbocharged engine system may be configured to receive the user input corresponding to one of the plurality of turbocharger modes. Additionally, the controller may be configured to determine the intake air pressure of the intake manifold. Further, the controller may be configured to compare the intake air pressure of the intake manifold with a predetermined threshold. Still further, the controller may be configured to adjust a position of a bypass valve based on the turbocharger mode corresponding to the user input and the intake air pressure in comparison to the predetermined threshold.

The plurality of turbocharger modes may include a whoosh mode, a flutter or choo-choo mode, a default mode, and a custom mode. The whoosh mode may include changing the position of the bypass valve to route excess air pressure from an intake circuit to an atmosphere via an exhaust line. The flutter or choo-choo mode may include changing the position of the bypass valve to restrict intake pressure from an intake circuit from venting to an atmosphere via an exhaust line. Additionally, the flutter or choo-choo mode may include changing the position of the bypass valve to reroute intake pressure from an intake circuit to an ambient air intake via a return line. The default mode may include changing the position of the bypass valve to mitigate excess air pressure on an intake circuit in response to a position of a throttle valve restricting air flow to an intake manifold by rerouting intake air from the intake circuit to an ambient air intake via a return line or by rerouting intake air from the intake circuit to an atmosphere via an exhaust line. The custom mode may include the whoosh mode, the flutter or choo-choo mode, and the default mode.

The turbocharged engine system may further include detecting a position of an accelerator pedal to determine whether the accelerator pedal is engaged or disengaged. Additionally, the turbocharged engine system may further include detecting a position of a throttle valve to determine whether the throttle valve is open or closed. Further, the turbocharged engine system may further include adjusting the position of the bypass valve based on the turbocharger mode corresponding to the user input, the intake air pressure exceeding the predetermined threshold, the accelerator pedal being disengaged, and the throttle valve being closed.

Notably, the present invention is not limited to the combination of the elements as listed above and may be assembled in any combination of the elements as described herein.

These and other capabilities of the disclosed subject matter will be more fully understood after a review of the following figures, detailed description, and claims.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1:
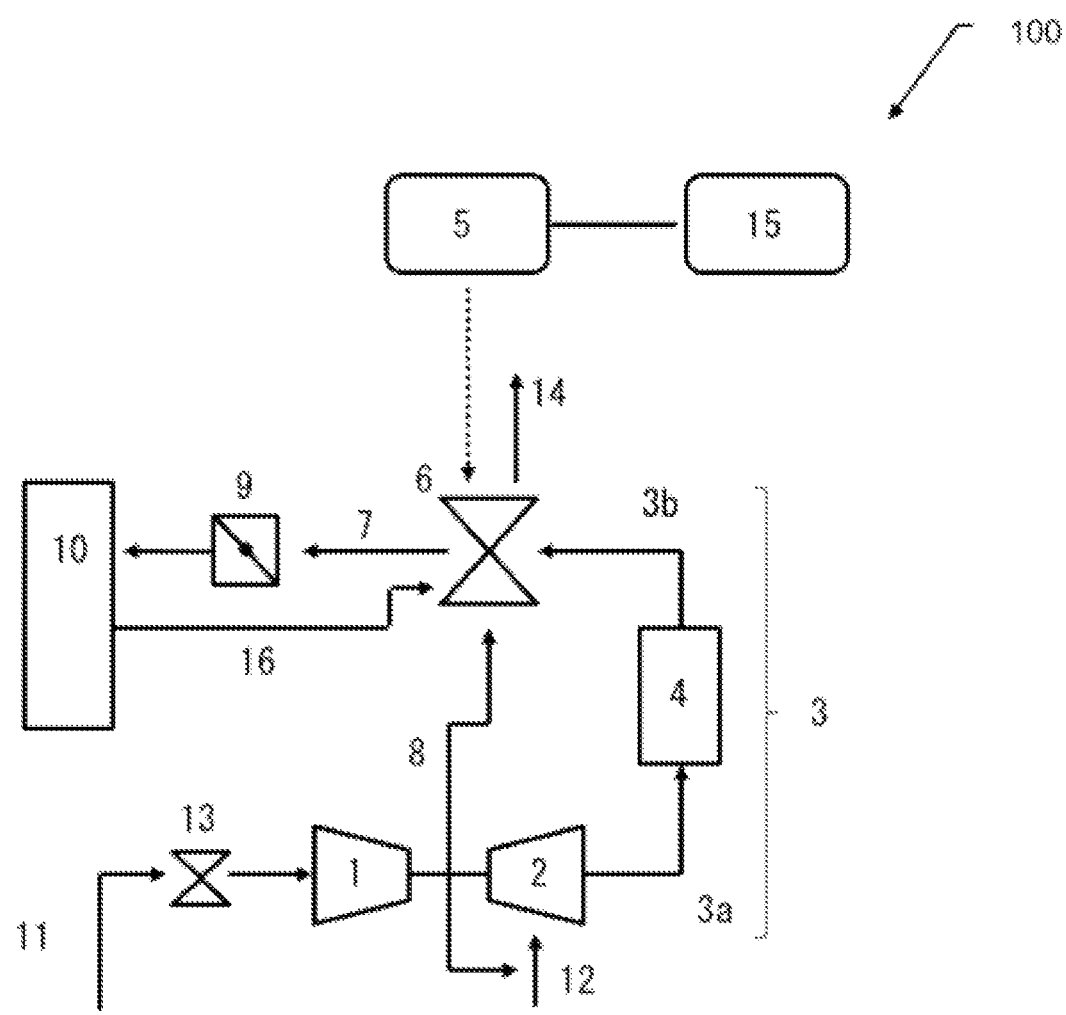
FIG. 1 illustrates a configuration of a turbocharged engine system according to an exemplary embodiment of the present invention.

It is noted that the drawings are not necessarily to scale. The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary embodiments and that the scope of the present invention is defined solely by the claims.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although at least one exemplary embodiment is described as using a plurality of units to perform the exemplary process, it is understood that the exemplary processes may also be performed by one or plurality of modules. Additionally, it is understood that the term controller/control unit may refer to a hardware device that includes a memory and a processor. The memory may be configured to store the modules and the processor may be specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third" and so on, herein, are provided to identify the operations, without describing the order of the operations, and the operations may be executed in a different order from the stated order unless a specific order is definitely specified in the context.

A method of controlling a turbocharged engine system includes customized and selective operation of a turbocharger bypass valve to modulate air pressure through an intake system of the engine to achieve certain desirable auditory feedback. Certain auditory responses are deliberately generated through control of engine systems.

For instance, the turbocharger bypass valve and related systems may be controlled to produce certain auditory feedback. In some exemplary embodiments, a user is prompted to select one of a plurality of turbocharger modes associated with one of a plurality of certain auditory responses, which may be referred to as profiles or modes. The method and system of the present disclosure enhance the user's enjoyment of the vehicle by allowing the user to easily generate specific auditory responses from the turbocharged engine system. In some exemplary embodiments, the user can generate these specific auditory responses by making a selection from a user interface. The system then makes necessary adjustments to the turbocharged engine to achieve the selected auditory response profile or mode.

NVH performance of a vehicle is a strong motivating factor that drives customer (or user or driver) perception of vehicle performance. By electronically operating the turbocharger pressure bypass valve of a turbocharger-equipped vehicle, the NVH performance of a vehicle may be positively modified to create a complete driving experience, one that more perceptibly alters the character of the vehicle.

The NVH response of the vehicle is altered to increase perception of differentiation of drive modes of the vehicle. The turbocharger bypass valve may be actuated based on user input. The user's input may be based on the user's preference. For example, in a sports car, the NVH response may be provided to further enhance the driver's perception of high performance. In an off-road vehicle or sport utility vehicle, the NVH response may reinforce the driver's perception of power. The customer may be presented with several NVH options that electronically control the turbocharger bypass valve, which is specifically calibrated to generate specified noises.

In some exemplary embodiments, the user's selection of a mode directly results in changes in a position of an air intake bypass valve. The change in the bypass valve may be performed independently of the vehicle drive mode and may not impact vehicle performance. Additionally, the driver selection criteria may be based on powertrain noise effects generated by particular driving conditions. The selection of a given auditory response may not necessarily favor performance of the engine. Rather than suppressing the generation of NVH factors, the method and system of the present disclosure may intentionally result in an increase in one or more NVH characteristics of the turbocharged system via the air intake bypass valve. For example, normally noise, vibration and/or harshness are associated with a negative driving experience; however, in a sports car, immediately after pressing the accelerator, it may be desirable for the user to hear a relatively loud audible response. In particular, in a turbocharged sports vehicle, a relatively loud noise, vibration or harsh feeling may be desirable to enhance the user's perception of the vehicle's high performance capabilities.

A method and system of controlling a turbocharged engine system are provided. The turbocharged engine system and control method may utilize multi-modal operation of an intake pressure bypass valve to modify an NVH profile of a vehicle in order to enhance customer perception of the vehicle's power and performance. The NVH profile may be modified to produce distinct, controlled and intentional positive auditory cues.

In some exemplary embodiments, a bypass valve is actuated to generate unique sound effects, which depend on a position or a setting of the bypass valve. Actuating the bypass valve to intentionally generate unique sound effects enhances NVH performance of the vehicle and increases customer perception of power and performance. The intake bypass valve and related components may be manipulated directly or indirectly to enhance auditory responses based on a user's preference and/or selection.

In some exemplary embodiments, an air intake bypass valve is utilized to relieve an air intake system of excess air pressure in conditions where a throttle blade is in a closed position. A user's selection may be utilized to directly affect behavior of the air intake bypass valve, which may be independent of a vehicle drive mode. The driver selection criteria may be designed with careful consideration of powertrain noise effects under certain driving conditions, and may not necessarily favor performance of the engine.

Distinct advantages and improvements are associated with the method and system of the present disclosure. Enhanced auditory responses generated by the method and system of the present disclosure may improve "sport mode" settings of the conventional art. In other words, in addition to tuning a vehicle in response to a user selection, the user may select enhanced auditory responses, which add extra cues for the user's enjoyment, which may enhance an overall driving experience. The user is provided with direct interaction of powertrain performance further increasing customer satisfaction.

As noted below, to achieve the advantages noted above, modifications may be made to instructions provided by a controller of a vehicle. Additionally, an intake air pressure bypass valve may be disposed on an intake circuit (as opposed to an exhaust circuit). Further, a customer selection interface (e.g., an input device) may be provided to allow a user to select and change a desired turbocharger mode. The input device may be mounted on a dashboard to receive user input and may be implemented as a touch screen, but is not limited thereto.

As shown in FIG. 1, in some exemplary embodiments, a turbocharged engine system 100 may be provided. The turbocharged engine system 100 may use exhaust gas 11 from an exhaust system to drive a turbine 1. The turbine 1 may be configured to drive a compressor 2, which pressurizes ambient air from an ambient air intake path 12. The pressurized ambient air from the ambient air intake path 12 may pass through an intercooler 4 to cool the air to achieve a desired air charge temperature. An intake air pressure bypass valve 6 may be provided to mitigate excess air pressure on an intake circuit.

The intake circuit may include first and second portions 3a, 3b of a first intake circuit 3. The first portion 3a of the first intake circuit 3 may be disposed between the compressor 2 and the intercooler 4. The second portion 3b of the first intake circuit 3 may be disposed between the intercooler 4 and the intake air pressure bypass valve 6. A second intake circuit 7 may be disposed between the intake air pressure bypass valve 6 and an intake manifold 10. A throttle valve 9 may be disposed between the intake air pressure bypass valve 6 and the intake manifold 10.

The throttle valve 9 may be in a position to restrict air flow to the intake manifold 10 (i.e., e.g., the throttle valve 9 may be closed). When the throttle valve 9 is closed, the intake air pressure bypass valve 6 may mitigate excess air pressure on the first intake circuit 3 and the second intake circuit 7 by rerouting intake air back to the ambient air intake path 12. The intake air may be rerouted back to the ambient air intake path 12 via a return line 8 (which may also be referred to as a bypass line). Additionally, the intake air may be routed to the atmosphere via an exhaust line 14. The turbocharged engine system 100 may be configured to (a) route air to the atmosphere, (b) trap air in the intake path, (c) route air to the intake, and/or (d) any combination of the above methods either alone or in combination with any other process, and one or more of the various combinations may be assigned to individual modes. Notably, the intercooler 4 may be disposed in parallel with the return line 8. Additionally, each of the turbine 1, the compressor 2, and the intake air pressure bypass valve 6 may be commonly connected to the ambient air intake path 12 via the return line 8. Alternatively, a direct return path may be provided from return line 8 to intake path 12 without direct connection to the turbine 1 or the compressor 2.

The turbocharged engine system 100 may include a customer selection interface 15, which may be accessed by a user with any suitable means including a touch screen and/or one or more mechanical buttons, typically installed on a dashboard or console of the vehicle in a position that is readily accessible to a driver or front-seated passenger of the vehicle. The customer selection interface 15 may be configured to communicate with a controller (ECU) 5. The ECU 5 may be configured to transmit instructions to the intake air pressure bypass valve 6 to operate the valve.

Exemplary embodiments of the control of the intake air pressure bypass valve 6 include generation of a "whoosh" NVH effect in one exemplary mode, and/or generation of a "fluttering" or "choo-choo" NVH effect in another exemplary mode. The "whoosh" NVH effect and the "fluttering" or "choo-choo" NVH effect are not to be limited by the use of the onomatopoetic terms "whoosh", "fluttering" or "choo-choo". The NVH effects according to present exemplary embodiments may be any sound profile produced by an engine. For example, NVH Effect A may be caused by excess intake air pressure routed to the atmosphere (under appropriate driving conditions) creating a "whoosh" NVH effect, or a sound similar to that. NVH Effect A includes all noises formed by compressed air rapidly escaping a small orifice. NVH Effect B may be caused by sustained excess intake air pressure within the intake stream (under appropriate driving conditions) creating backpressure against the compressor, creating a "fluttering" NVH effect, or a sound similar to that of winding or slipping gears. NVH Effect C and other effects may be caused by other unique air pressure routing methods from the bypass valves.

In addition, default and user customized modes may be provided that omit, alter or combine one or more aspects of the "whoosh" NVH effect and the "fluttering" or "choo-choo" NVH effect. These modes may be selected by the user through selections made using the user selection interface 15. The terms "whoosh", "fluttering" and "choo-choo" are not intended to be limiting and may include any other auditory effect generated by a turbocharged engine system. In some exemplary embodiments, sounds generated by various positions of the intake air pressure bypass valve 6 are desired.

As detailed below, the ECU 5, the intake air pressure bypass valve 6, and the user selection interface 15 may be configured to provide different paths for intake and exhaust air depending on particular decisions or behavior. In some exemplary embodiments, the selection mechanism may be based on the NVH effect that results from the throttle valve 9 being closed, while the first intake circuit 3 is pressurized.

For example, in the one exemplary mode, the bypass valve 6 may route excess air pressure to the atmosphere via the exhaust line 14 generating the "whoosh" (or related) noise effect. A user of the vehicle may be prompted to select from a plurality of options, via the user selection interface 15, a mode corresponding to generation of the "whoosh" noise effect.

In another exemplary mode, the bypass valve 6 may restrict intake pressure in the first intake circuit 3 from passing to the atmosphere via the exhaust line 14. Additionally, the bypass valve 6 may reroute intake pressure in the first intake circuit 3 back to the compressor intake stream, i.e., the ambient air intake path 12, via the return line 8. By restricting intake pressure and/or rerouting intake pressure with the bypass valve 6, a "fluttering" or "choo-choo" NVH effect may be generated. The "fluttering" or "choo-choo" NVH effect may be generated from intake backpressure in the first intake circuit 3 acting on the compressor 2.

In some exemplary embodiments, a wastegate valve 13 may be disposed between the exhaust system and the turbine 1. Additionally, an intake pressure reference line 16 may be disposed between the intake manifold 10 and the bypass valve 6. The intake pressure reference line 16 may be disposed in parallel with the second intake circuit 7 connected to the throttle valve 9, as shown in FIG. 1.

As described in greater detail below, in some exemplary embodiments of the present disclosure, the user may select an NVH effect via the user selection interface 15. The user selection of the NVH effect may result in a change in a position of the bypass valve 6, the routing of intake and exhaust air, and the like. The processes and methods described hereinbelow may be executed by a controller. One or more steps of the methods described herein may be executed by the controller. The controller may be separate from the ECU 5 or may form a part of the ECU 5.

The user selection interface 15 may function in accordance with a process. In general, the process may include a user-driven and/or mode applicable vehicle powertrain NVH enhancement function. The process may be configured to modify operation of one or more portions of the turbocharged engine system 100 including, e.g., the bypass valve 6, a blow off valve (not shown), a logic control system for an engine management system (EMS) (not shown), and a logic control system for a hybrid controller (HCU) (not shown). A customer may be provided with an option to enhance the powertrain NVH via manipulation of the turbo intake bypass valve, e.g., bypass valve 6. A Selection A may be configured to redirect excess intake air pressure to the atmosphere generating a first unique auditory response. A Selection B may be configured to hold intake pressure generating a different, second unique auditory response. Further Selections may be added beyond those illustrated in FIG. 2 and described below.

Figure 2:
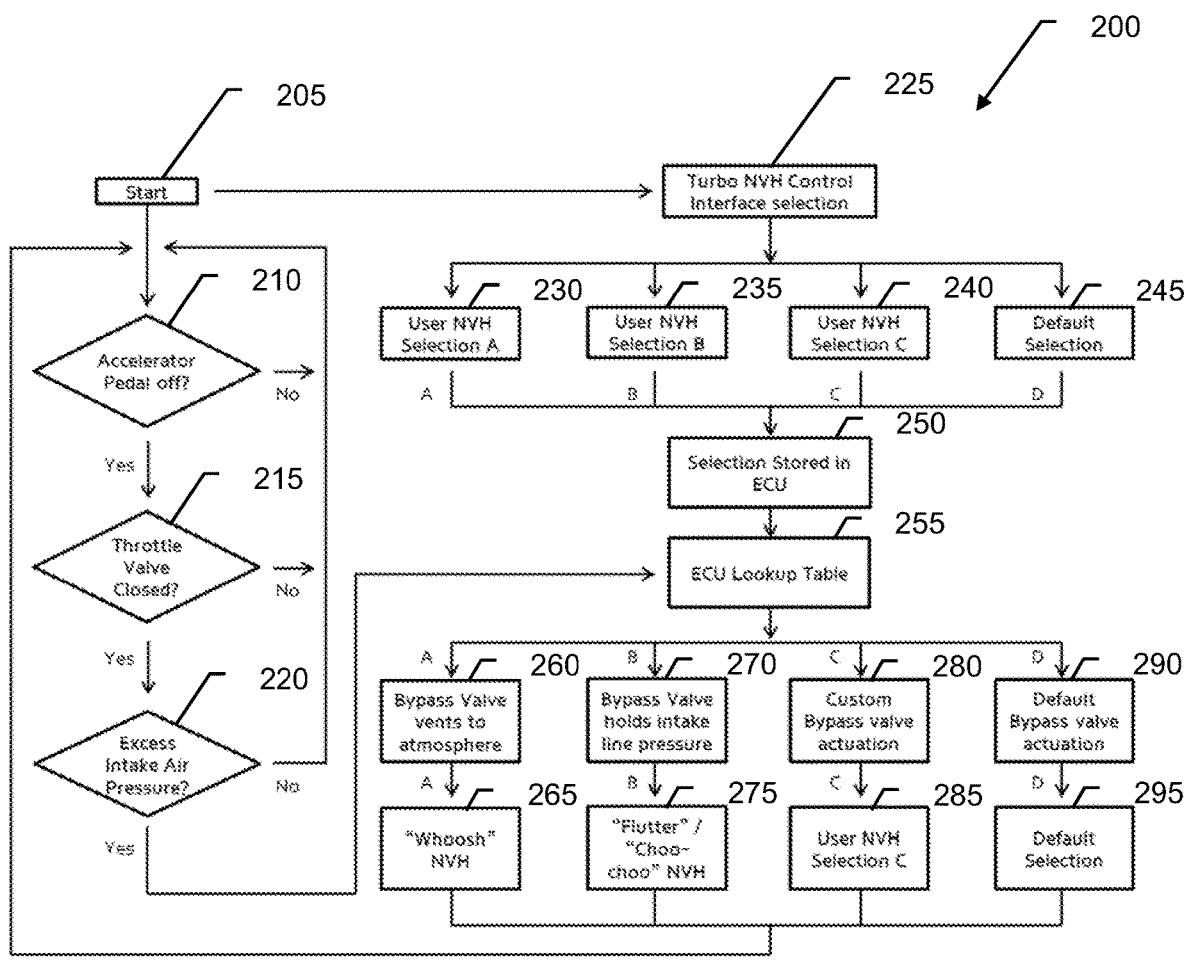
FIG. 2 is a process diagram illustrating a method of controlling a turbocharged engine system according to an exemplary embodiment of the present disclosure.
Figure 3:
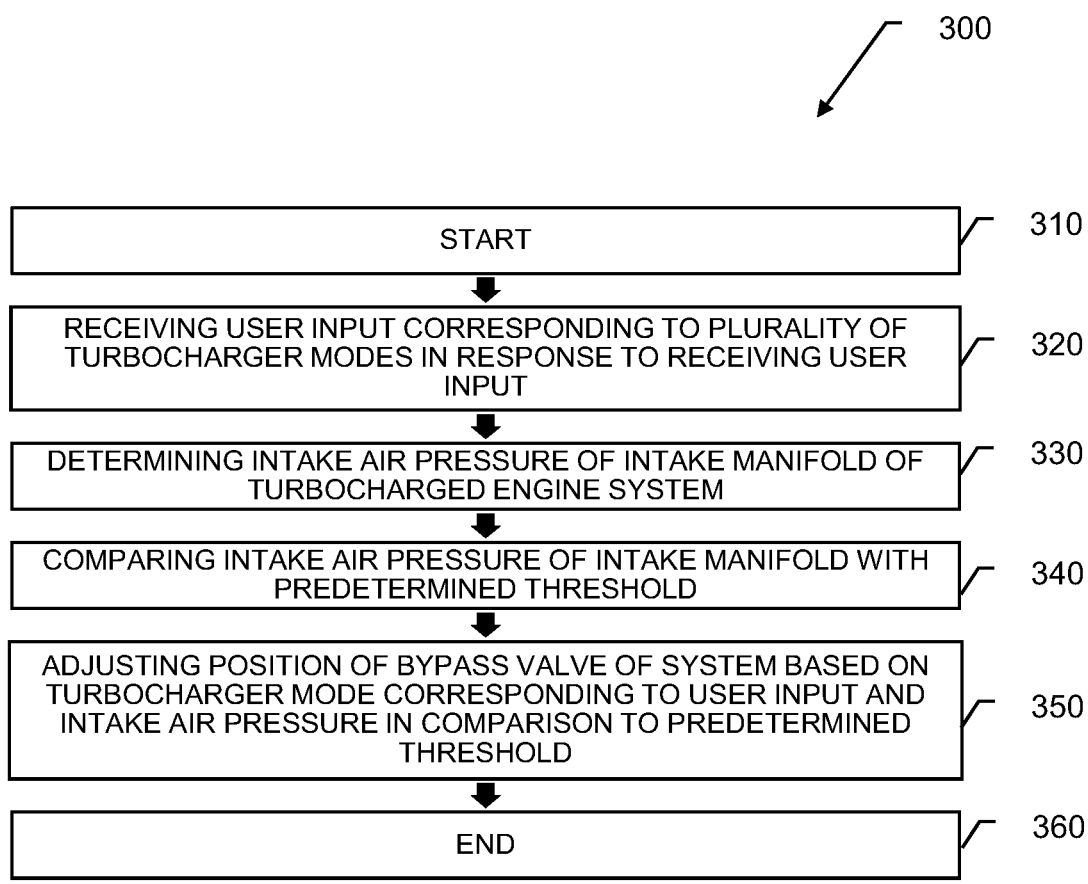
FIG. 3 is a flowchart illustrating a method of controlling a turbocharged engine system according to an exemplary embodiment of the present disclosure.

As shown in FIG. 2, in some exemplary embodiments, a process 200 for the user selection interface 15 may start 205 with preconditions (steps 210, 215 and 220) that may occur before customer selection is activated or at any other suitable time during the process 200. The preconditions may include one or more of the following steps in any suitable order.

The process 200 may include a step 210 of detecting a position of an accelerator pedal, and determining whether the accelerator pedal is engaged (or "No" as shown in FIG. 2) or disengaged (or "Yes" as shown in FIG. 2) based on the detecting of the position of the accelerator pedal. Additionally, the process 200 may include a step 215 of detecting a position of a throttle valve (e.g., the throttle valve 9), and determining whether the throttle valve is open (or "No" as shown in FIG. 2) or closed (or "Yes" as shown in FIG. 2) based on the detecting the position of the throttle valve. Further, the process 200 may include a step 220 of detecting a pressure of air at any position within the engine including an intake manifold (e.g., the intake manifold 10), the intake circuit (e.g., the first intake circuit 3 and/or the second intake circuit 7), and determining whether the pressure of the air is less than or equal to a predetermined threshold (or "No" as shown in FIG. 2) or greater than the predetermined threshold (or "Yes" as shown in FIG. 2), based on the detecting of the pressure of the air at any position within the engine.

Alternatively, the process 200 may include a step 220 of detecting a pressure of air at any position within the engine including an intake manifold (e.g., the intake manifold 10), the intake circuit (e.g., the first intake circuit 3 and/or the second intake circuit 7), and determining whether the pressure of the air is less than a predetermined threshold (or "No" as shown in FIG. 2) or greater than or equal to the predetermined threshold (or "Yes" as shown in FIG. 2), based on the detecting of the pressure of the air at any position within the engine.

The "predetermined threshold" may refer to a measured air pressure that has been experimentally determined to create a specific NVH effect given required conditions. For example: Predetermined threshold A (directly related to NVH effect A) may include an intake system air pressure value that is greater than the ambient air pressure (about 1 atm), and that has been proven to create an NVH effect similar to the noise of compressed air rapidly escaping a small orifice. Predetermined threshold B (directly related to NVH effect B) may include an intake system air pressure value that is equal to or greater than the current pressure being created by the compressor, which has been proven to create an NVH effect similar to noise of winding or grinding gears. Predetermined threshold C and beyond may include intake air pressures that have been determined to create specific various NVH effects, based on their unique routing.

In some exemplary embodiments, as shown in FIG. 2, if any of the steps 210, 215 and 220 results in a "No" determination (i.e., e.g., the accelerator pedal is engaged, or the throttle valve is open, or the excess intake air pressure is less than or equal to the predetermined threshold), then the process may revert to the precondition process (steps 210, 215 and 220) and continue until all three of the steps 210, 215 and 220 result in a "Yes" determination (i.e., e.g., the accelerator pedal is disengaged, and the throttle valve is closed, and the excess intake air pressure is greater than the predetermined threshold).

Alternatively, if any of the steps 210, 215 and 220 results in a "No" determination (i.e., e.g., the accelerator pedal is engaged, or the throttle valve is open, or the excess intake air pressure is less than the predetermined threshold), then the process may revert to the precondition process (steps 210, 215 and 220) and continue until all three of the steps 210, 215 and 220 result in a "Yes" determination (i.e., e.g., the accelerator pedal is disengaged, and the throttle valve is closed, and the excess intake air pressure is greater than or equal to the predetermined threshold).

In some exemplary embodiments, as shown in FIG. 2, if all three of the steps 210, 215 and 220 results in a "Yes" determination (i.e., e.g., the accelerator pedal is disengaged, and the throttle valve is closed, and the excess intake air pressure is greater than (or, in the alternative, greater than or equal to) the predetermined threshold), then the process 200 advances to the ECU lookup table step 255, described in greater detail below.

In addition to the preconditions described above, a turbo NVH control interface selection step 225 may be executed by the user selection interface 15 prior to or after the start 205 of the process 200. In some exemplary embodiments, a user may be presented with a selection menu that allows for control (or actuation) of the bypass valve 6, which may be based on NVH characteristics of specific intake pressure routing. The customer or user may be prompted with a plurality of selections, which may include, for example, Selection A, Selection B, Selection C, and Selection D. Any of Selections A-D, inclusive, may be set as a default condition.

In some exemplary embodiments, a user selection of a button or icon corresponding with Selection A may notify the ECU 5 that Selection A has been selected by the user (step 230), in response, the ECU 5 may be configured to transmit instructions to the electronically operated bypass valve 6 to route or vent excess intake air pressure to the atmosphere, e.g., via the exhaust line 14 (step 260), while the throttle valve 9 is closed, creating the "whoosh" NVH effect (step 265).

In some exemplary embodiments, a user selection of a button or icon corresponding with Selection B may notify the ECU 5 that Selection B has been chosen by the user (step 235), in response, the ECU 5 may be configured to transmit instructions to the electronically operated bypass valve 6 to maintain or hold excess intake air pressure within the intake stream (e.g., within the first intake circuit 3 and the second intake circuit 7), creating backpressure against the compressor 2 (step 270), creating the "fluttering" or "choo-choo" NVH effect (step 275).

In some exemplary embodiments, a user selection of a button or icon corresponding with Selection C may notify the ECU 5 that Selection C has been chosen by the user (step 240), thus transmitting instructions to the electronically operated bypass valve 6 to be actuated to operate the bypass valve 6 to create a desired effect (step 280), which may be designed by a calibrator and/or the user, creating a custom NVH effect (step 285). Selection C (a custom setting) may include an intake system air pressure that is greater than atmospheric pressure, and less than that of Selection A, which has been proven to create a unique NVH effect different than that of Selections A and B. Selection C may also include an intake air pressure that is greater than that of Selection B, which has been shown to create a unique NVH effect different than that of Selections A and B. In summary, Selection C represents a unique NVH effect that may be created using different intake pressure thresholds in conjunction with similar intake air routing methods seen in Selections A or B.

In some exemplary embodiments, a user selection of a button or icon corresponding with Selection D may notify the ECU 5 that Selection D has been chosen by the user (step 245), thus transmitting instructions to the electronically operated bypass valve 6 to be actuated to operate the bypass valve 6 to operate in a default mode (step 290). The default mode may correspond with standard, factory settings of the vehicle. The default mode may result in generation of an NVH effect (step 295). In some exemplary embodiments, the default mode may be overridden by other modes such as "sport mode" or "economy mode" or, in other exemplary embodiments, may be independent of such modes.

In some exemplary embodiments, after the completion of the steps 260-295, inclusive, the process 200 may revert to the precondition process (steps 210, 215 and 220) and continue again until all three of the steps 210, 215 and 220 result in a "Yes" determination as described above. The user selection in accordance with steps 230, 235, 240 and 245 may be stored in the ECU 5 (step 250). The stored user selection may trigger a determination of engine settings with reference to an ECU lookup table (step 255). In some exemplary embodiments, step 255 may not occur unless and until all three of steps 210, 215 and 220 result in a "Yes" determination, as noted above.

In one exemplary embodiment, a process 300 may be performed by the system 100 in accordance with the process 200. Specifically, the process 300 may include a start instruction (step 310). The process 300 may include receiving, by a processor, a user input corresponding to one of a plurality of turbocharger modes in response to receiving the user input (step 320). The process 300 may include determining, by the processor, an intake air pressure of an intake manifold of the turbocharged engine system (step 330). The process 300 may include comparing, by the processor, the intake air pressure of the intake manifold with a predetermined threshold (step 340). The process 300 may include adjusting, by the processor, a position of a bypass valve based on the turbocharger mode corresponding to the user input and the intake air pressure in comparison to the predetermined threshold (step 350). The process 300 may include an end instruction (step 360).

The foregoing description has been directed to exemplary embodiments of the present disclosure. It will be apparent, however, that other variations and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:

1. A method of controlling a turbocharged engine system, comprising:
   receiving, by a processor, a user input corresponding to one of a plurality of turbocharger modes;
   in response to receiving the user input, determining, by the processor, an intake air pressure of an intake manifold of the turbocharged engine system;
   comparing, by the processor, the intake air pressure of the intake manifold with a predetermined threshold; and
   adjusting, by the processor, a position of a bypass valve based on the turbocharger mode corresponding to the user input and the intake air pressure in comparison to the predetermined threshold, wherein the plurality of turbocharger modes includes a whoosh mode, a flutter or choo-choo mode, a default mode, and a custom mode.

2. The method of claim 1, wherein the whoosh mode includes changing the position of the bypass valve to route excess air pressure from an intake circuit to an atmosphere via an exhaust line.

3. The method of claim 1, wherein the flutter or choo-choo mode includes changing the position of the bypass valve to restrict intake pressure from an intake circuit from venting to an atmosphere via an exhaust line.

4. The method of claim 1, wherein the flutter or choo-choo mode includes changing the position of the bypass valve to reroute intake pressure from an intake circuit to an ambient air intake via a return line.

5. The method of claim 1, wherein the default mode includes changing the position of the bypass valve to mitigate excess air pressure on an intake circuit in response to a position of a throttle valve restricting air flow to an intake manifold by rerouting intake air from the intake circuit to an ambient air intake via a return line or by rerouting intake air from the intake circuit to an atmosphere via an exhaust line.

6. The method of claim 1, wherein the bypass valve is disposed between the intake manifold and a turbocharger of the turbocharged engine system.

7. A method of controlling a turbocharged engine system, comprising:
   receiving, by a processor, a user input corresponding to one of a plurality of turbocharger modes,
   in response to receiving the user input, determining, by the processor, an intake air pressure of an intake manifold of the turbocharged engine system,
   comparing, by the processor, the intake air pressure of the intake manifold with a predetermined threshold;
   adjusting, by the processor, a position of a bypass valve based on the turbocharger mode corresponding to the user input and the intake air pressure in comparison to the predetermined threshold;
   detecting a position of an accelerator pedal to determine whether the accelerator pedal is engaged or disengaged;
   detecting a position of a throttle valve to determine whether the throttle valve is open or closed; and
   adjusting the position of the bypass valve based on the turbocharger mode corresponding to the user input, the intake air pressure exceeding the predetermined threshold, the accelerator pedal being disengaged, and the throttle valve being closed.

8. A turbocharged engine system, comprising:
   a turbine connected to an exhaust gas line;
   a compressor connected to the turbine, wherein both the turbine and the compressor are connected to an ambient air intake via a return line;
   an intercooler connected to the compressor via a first portion of a first intake circuit;
   a controller configured to transmit operating instructions to an intake air pressure bypass valve, wherein the intake air pressure bypass valve is connected to the intercooler via a second portion of the first intake circuit, the intake air pressure bypass valve is connected to the turbine, the compressor, and the ambient air intake via the return line, and the intake air pressure bypass valve is connected to an atmosphere via an exhaust line;
   an intake manifold connected to the intake air pressure bypass valve and a throttle valve via a second intake circuit; and
   a customer selection interface configured to receive a user input corresponding to one of a plurality of turbocharger modes, and configured to transmit operating instructions to the controller based on the turbocharger mode corresponding to the user input.

9. The turbocharged engine system of claim 8, wherein the controller is configured to:
   receive the user input corresponding to one of the plurality of turbocharger modes;
   determine the intake air pressure of the intake manifold;
   compare the intake air pressure of the intake manifold with a predetermined threshold; and
   adjust a position of the bypass valve based on the turbocharger mode corresponding to the user input and the intake air pressure in comparison to the predetermined threshold.

10. The turbocharged engine system of claim 9, wherein the bypass valve is disposed between the intake manifold and a turbocharger of the turbocharged engine system.

11. The turbocharged engine system of claim 9, further comprising:
   detecting a position of an accelerator pedal to determine whether the accelerator pedal is engaged or disengaged;
   detecting a position of a throttle valve to determine whether the throttle valve is open or closed;
   adjusting the position of the bypass valve based on the turbocharger mode corresponding to the user input, the intake air pressure exceeding the predetermined threshold, the accelerator pedal being disengaged, and the throttle valve being closed.

12. The turbocharged engine system of claim 8, wherein the plurality of turbocharger modes includes a whoosh mode, a flutter or choo-choo mode, a default mode, and a custom mode.

13. The turbocharged engine system of claim 12, wherein the whoosh mode includes changing the position of the bypass valve to route excess air pressure from an intake circuit to an atmosphere via an exhaust line.

14. The turbocharged engine system of claim 12, wherein the flutter or choo-choo mode includes changing the position of the bypass valve to restrict intake pressure from an intake circuit from venting to an atmosphere via an exhaust line.

15. The turbocharged engine system of claim 12, wherein the flutter or choo-choo mode includes changing the position of the bypass valve to reroute intake pressure from an intake circuit to an ambient air intake via a return line.

16. The turbocharged engine system of claim 12, wherein the default mode includes changing the position of the bypass valve to mitigate excess air pressure on an intake circuit in response to a position of a throttle valve restricting air flow to an intake manifold by rerouting intake air from the intake circuit to an ambient air intake via a return line or by rerouting intake air from the intake circuit to an atmosphere via an exhaust line.

\* \* \* \* \*